United States Patent
Escale et al.

(10) Patent No.: US 10,815,344 B2
(45) Date of Patent: *Oct. 27, 2020

(54) COMPOSITION COMPRISING A FIBROUS MATERIAL, A MULTISTAGE POLYMER AND A (METH) ACRYLIC POLYMER, ITS METHOD OF PREPARATION AND ITS USE

(71) Applicant: Arkema France, Colombes (FR)

(72) Inventors: Pierre Escale, Pau (FR); Raber Inoubli, Villeurbanne (FR); Pierre Gerard, Denguin (FR); Philippe Hajji, Chatillon D'Azergues (FR)

(73) Assignee: Arkema France, Colombes (FR)

( * ) Notice: Subject to any disclaimer, the term of this patent is extended or adjusted under 35 U.S.C. 154(b) by 3 days.

This patent is subject to a terminal disclaimer.

(21) Appl. No.: 16/311,712

(22) PCT Filed: Jun. 23, 2017

(86) PCT No.: PCT/EP2017/065566
§ 371 (c)(1),
(2) Date: Dec. 20, 2018

(87) PCT Pub. No.: WO2017/220791
PCT Pub. Date: Dec. 28, 2017

(65) Prior Publication Data
US 2019/0248968 A1    Aug. 15, 2019

(30) Foreign Application Priority Data
Jun. 23, 2016  (FR) ...................... 16 55832

(51) Int. Cl.
| | | |
|---|---|---|
| *C08J 5/04* | (2006.01) | |
| *B29B 15/10* | (2006.01) | |
| *C08L 33/12* | (2006.01) | |
| *C08L 51/00* | (2006.01) | |
| *C08K 7/02* | (2006.01) | |
| *C08L 47/00* | (2006.01) | |

(52) U.S. Cl.
CPC ............. *C08J 5/043* (2013.01); *B29B 15/105* (2013.01); *C08K 7/02* (2013.01); *C08L 33/12* (2013.01); *C08L 47/00* (2013.01); *C08L 51/003* (2013.01); *C08J 2333/10* (2013.01)

(58) Field of Classification Search
USPC .......................................... 524/494
See application file for complete search history.

(56) References Cited

U.S. PATENT DOCUMENTS

| | | |
|---|---|---|
| 3,793,402 A | 2/1974 | Owens |
| 4,119,746 A | 10/1978 | Bleyle |
| 6,616,971 B2 | 9/2003 | Evans |
| 2003/0054150 A1 | 3/2003 | Evans |
| 2010/0267891 A1 | 10/2010 | Sakata et al. |
| 2012/0046416 A1 | 2/2012 | Pirri et al. |
| 2014/0038481 A1 | 2/2014 | Chen et al. |
| 2014/0058024 A1 | 2/2014 | Son et al. |
| 2015/0344649 A1 | 12/2015 | Sequeira |
| 2019/0010361 A1 | 1/2019 | Hoshi et al. |

FOREIGN PATENT DOCUMENTS

| | | |
|---|---|---|
| JP | 2006182925 A | 7/2006 |
| JP | 3967810 | 8/2007 |
| WO | WO 2014/125044 A1 | 8/2014 |
| WO | WO 2015/167881 A1 | 11/2015 |

OTHER PUBLICATIONS

Gottfried W. Ehrenstein & Josef Kabelka, Reinforced Plastics, 31 Ullmann's Encyclopedia of Industrial Chemistry, 453 (published online 2010).

*Primary Examiner* — Terressa Boykin
(74) *Attorney, Agent, or Firm* — Lynn B. Morreale

(57) ABSTRACT

The present invention relates to a composition comprising a fibrous material, a multistage polymer and a (meth)acrylic polymer. The composition can be in form of a prepreg, a preform or a laminate. The present invention further relates to a method for making a composition comprising a fibrous material, a multistage polymer and a (meth)acrylic polymer and its use in making composite articles. The present invention also relates to a process for preparing a composition comprising a fibrous material, a multistage polymer and a (meth)acrylic polymer and its use for producing fibre reinforced impact modified composites.

23 Claims, No Drawings

COMPOSITION COMPRISING A FIBROUS MATERIAL, A MULTISTAGE POLYMER AND A (METH) ACRYLIC POLYMER, ITS METHOD OF PREPARATION AND ITS USE

CROSS-REFERENCE TO RELATED APPLICATIONS

This application is a national stage application under 35 U.S.C. § 371 of PCT/EP2017/065566, filed Jun. 23, 2017 which claims benefit to application FR 16 55832, filed Jun. 23, 2016.

FIELD OF THE INVENTION

The present invention relates to a composition comprising a fibrous material, a multistage polymer and a (meth)acrylic polymer. The composition can be in form of a prepreg, a preform or a laminate.

In particular the present invention it relates to a method for making a composition comprising a fibrous material, a multistage polymer and a (meth)acrylic polymer and its use in making composite articles.

More particularly the present invention relates to a process for preparing a composition comprising a fibrous material, a multistage polymer and a (meth)acrylic polymer and its use for producing fibre reinforced impact modified composites.

Technical Problem

Mechanical parts that have to withstand high stresses during their use are widely manufactured from composite materials. A composite material is a macroscopic combination of two or more immiscible materials. The composite material consists of at least one material which forms the matrix, i.e. a continuous phase that ensures the cohesion of the structure, and a reinforcing material.

The aim in using composite materials is to achieve a performance from the composite material that is not available from its separate constituents if used alone. Consequently composite materials are widely used in several industrial sectors as for example building, automotive, aerospace, transport, leisure, electronics, and sport notably due to their better mechanical performance (higher tensile strength, higher tensile modulus, and higher fracture toughness) in comparison with homogenous materials and their low density.

The most important class in view of volume in commercial industrial scale, are composites with organic matrices, where the matrix material is a generally polymer. The principal matrix or continuous phase of a polymeric composite material is either a thermoplastic polymer or a thermosetting polymer.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently.

In order to prepare the polymeric composite material the prepolymer is mixed with the other component such as glass beads or fibres (reinforcing material) or the other component which is wetted or impregnated with prepolymer and cured afterwards. Example for prepolymers or matrix material for thermoset polymers are unsaturated polyesters, vinylesters, epoxy or phenolic ones. After curing a thermoset composite cannot be reformed and stays in his predetermined shape.

Thermoplastic polymers consist of linear or branched polymers, which are not crosslinked. The thermoplastic polymers are heated in order to mix the constituents necessary for producing the composite material and to be cooled for setting. The limit in using thermoplastic polymers for the fabrication of composite materials is their high viscosity in the molten state in order to homogenously impregnating for example a fibrous substrate. The wetting or correct impregnation of the fibers by the thermoplastic polymer can only be achieved, if the thermoplastic resin is sufficiently fluid.

Another way for impregnating the fibrous substrate is to dissolve the thermoplastic polymer in an organic solvent. The solution is used for impregnation and solvent is evaporated.

Still another way for preparing a thermoplastic composite is impregnating the fibrous substrate with a liquid syrup that comprises a monomer and polymerization of said monomer.

Nevertheless many of the polymers used for the preparation of composite materials remain very fragile and do not have good mechanical properties, for instance impact strength. Although the fibrous substrate makes it possible to reinforce the mechanical properties of material by absorbing the energy due to an impact, since the matrix based on thermoplastic polymer is fragile, it cannot prevent the propagation of cracks, for example, and as such the final composite material still remains too fragile.

To improve the impact strength of a polymer, it is known practice to add an impact additive, which modifies the impact strength, comprising an elastomeric phase or rubber. Such a rubber can be part of a multistage polymer in form of core shell particles, with one stage that is a rubber or the elastomeric phase. These particles are prepared by emulsion polymerization to form a dispersion and can for example be recovered in powder form. They generally comprise a succession of "hard" and "soft" layers. Two-layer (soft-hard) or three-layer (hard-soft-hard) particles may thus be found. The particle size is generally less than 1 µm and more particularly between 50 nm and 500 nm.

The multistage polymer in form of core shell particles is available as agglomerated dry powder, the latter is dispersed in the matrix in order to obtain a homogenous distribution of the initial core shell particles. For certain thermosetting polymers or resins, as especially epoxy resin, but also for thermoplastic polymers it is very difficult or nearly impossible to disperse correctly these multistage polymer particles.

Dispersing these usually weakly cross-linked discrete core shell particles in the liquid syrup or prepolymers in order to impregnate the fibrous reinforcement poses problems during the impregnation step. In fact the particles swell in the syrup which leads to gelation of the syrup. The viscosity is then too high and it is no longer possible to impregnate the fibrous substrate without defects appearing. To avoid this gelation phenomenon, the content of these particles in the resin must be limited to a very low content. However, such a content remains too low and does not conduct to the expected mechanical properties, especially as regards the impact strength.

The objective of the present invention is to obtain a composition that comprises a fibrous material, a multistage polymer and a (meth)acrylic polymer suitable for being used in polymeric composite material.

An objective of the present invention is also to obtain a stable composition that comprises a fibrous material, a multistage polymer and a (meth)acrylic polymer that can be used for producing an impact modified polymeric composites.

An additional objective of the present invention is to obtain a stable preform that comprises a fibrous material, a multistage polymer and a (meth)acrylic polymer.

Another additional objective of the present invention is a process to prepare a composition that comprises a fibrous material, a multistage polymer and a (meth)acrylic polymer.

Another objective of the present invention is to find a method to introduce a multistage polymer in a polymeric composite material or mechanical or structured parts or articles comprising the polymeric composite material.

Still another objective of the present invention is a process to obtain a stable preform that comprises a fibrous material, a multistage polymer and a (meth)acrylic polymer.

Still an additional objective is having a process for manufacturing an impact modified polymeric composite material or mechanical or structured parts or articles comprising the impact modified polymeric composite material.

BACKGROUND OF THE INVENTION

Prior Art

The document EP1085968 discloses composite articles including prepregs, preforms, laminates and sandwich moldings and methods of making the same. In particular a strand of a plurality of fibres coated with polymer particles is disclosed. The polymer particle is a thermoplastic polymer or a crosslinked thermoplastic polymer. The document discloses EP1312453 discloses composite articles including prepregs, preforms, laminates and sandwich moldings and methods of making the same. In particularly a strand of a plurality of fibres coated with polymer particles is disclosed that have an average diameter of less than 5 µm. The polymer particle is a thermoplastic polymer or a crosslinked thermoplastic polymer. Polymer particles of small size with between 0.1 µm to 0.25 µm having high molecular weights of at least 10,000 g/mol are mentioned.

None of the prior art documents discloses a composition, a process or use according to the present invention.

BRIEF DESCRIPTION OF THE INVENTION

Surprisingly it has been found that a composition comprising
  a) a fibrous material and
  b) a multi stage polymer and
  c) a (meth)acrylic polymer (P1),
wherein the quantity of multi stage polymer in the composition is between 3 wt % and 50 wt % and the (meth) acrylic polymer (P1) has a mass average molecular weight Mw of less than 100 000 g/mol, is suitable for being used in polymeric composite material.

Surprisingly it has been found that a preform comprising
  a) a fibrous material and
  b) a multi stage polymer and
  c) a (meth)acrylic polymer (P1),
wherein the quantity of multi stage polymer in the preform is between 3 wt % and 50 wt % and the (meth) acrylic polymer (P1) has a mass average molecular weight Mw of less than 100 000 g/mol, keeps its shape.

Surprisingly it has also been found that a composition comprising
  a) a fibrous material and
  b) a multi stage polymer and
  c) a (meth)acrylic polymer (P1),
wherein the quantity of multi stage polymer in the preform is between 3 wt % and 50 wt % and the (meth) acrylic polymer (P1) has a mass average molecular weight Mw of less than 100 000 g/mol, can be used for manufacturing a polymeric composite material or mechanical or structured parts or articles comprising the polymeric composite material.

Surprisingly it has also been found that a process for manufacturing a composition comprising the steps of
  a) bringing into contact a fibrous material and the a multistage polymer and a (meth) acrylic polymer (P1) that has a mass average molecular weight Mw of less than 100 000 g/mol,
wherein the quantity of multi stage polymer in the composition is between 3 wt % and 50 wt % yields to a composition that can used in polymeric composite material.

DETAILED DESCRIPTION OF THE INVENTION

According to a first aspect, the present invention relates to a composition comprising
  a) a fibrous material and
  b) a multi stage polymer,
  c) a (meth)acrylic polymer (P1),
wherein the quantity of multi stage polymer in the composition is between 3 wt % and 50 wt % and the (meth) acrylic polymer (P1) has a mass average molecular weight Mw of less than 100 000 g/mol.

According to a second aspect, the present invention relates to a process for manufacturing a preform comprising the steps
  a) bringing into contact a fibrous material and the a multistage polymer and a (meth) acrylic polymer (P1) that has a mass average molecular weight Mw of less than 100 000 g/mol,
wherein the quantity of multi stage polymer in the preform is between 3 wt % and 50 wt %.

According to a third aspect, the present invention relates to preform comprising
  a) a fibrous material and
  b) a multi stage polymer,
  c) a (meth)acrylic polymer (P1),
wherein the quantity of multi stage polymer in the preform is between 3 wt % and 50 wt % and the (meth) acrylic polymer (P1) has a mass average molecular weight Mw of less than 100 000 g/mol.

In a fourth aspect the present invention relates to the use of a preform comprising
  a) a fibrous material and
  b) a multi stage polymer,
  c) a (meth)acrylic polymer (P1),
wherein the quantity of multi stage polymer in the preform is between 3 wt % and 50 wt % and the (meth) acrylic polymer (P1) has a mass average molecular weight Mw of less than 100 000 g/mol for manufacturing a polymeric composite material or mechanical or structured parts or articles comprising the polymeric composite material.

In a fifth aspect the present invention relates to the use of a composition comprising
  a) a fibrous material and
  b) a multi stage polymer,
  c) a (meth)acrylic polymer (P1),
wherein the quantity of multi stage polymer in the composition is between 3 wt % and 50 wt % and the (meth) acrylic polymer (P1) has a mass average molecular weight Mw of less than 100 000 g/mol for manufacturing a polymeric composite material or mechanical or structured parts or articles comprising the polymeric composite material.

By the term "polymer powder" as used is denoted a polymer comprising powder grains in the range of at least 1 micrometer (μm) obtained by agglomeration of primary polymer or polymers or oligomers comprising particles in the nanometer range.

By the term "primary particle" as used is denoted a spherical polymer comprising particles in the nanometer range. Preferably the primary particle has a weight average particle size between 20 nm and 800 nm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer.

By the term "(meth) acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "impact modifier" as used is understood a material that once incorporated in a polymeric material increases the impact resistance and toughness of that polymeric material by phase micro domains of a rubbery material or rubber polymer.

By the term "rubber" as used is denoted to the thermodynamic state of the polymer above its glass transition.

By the term "rubber polymer" as used is denoted a polymer that has a glass transition temperature (Tg) below 0° C.

By the term "preform" as used is denoted a pre-shaped fibrous reinforcement, well known in composite manufacturing. The initial aspect of for example a fibrous mat as fibrous reinforcement, which is flexible, is kept in a certain already fixed shape by for example the polymer. The shape of a more complex preform corresponds to the later component geometry, where the individual fiber orientations are fixed in the layers by a suitable binder. It is a fiber semi-finished product that essentially already has the necessary outer contours: a preform, which is rigid enough to be fully automated and accurately placed. The preform is finished by adding for example a resin or impregnating the preform with a resin, which is polymerized in order to obtain the finished composite or structured article.

By the term "prepreg" as used is denoted a combination of mat, fabric, nonwoven material, or roving with resin.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

The composition according to the invention is comprising a fibrous material, a multi stage polymer and a (meth) acrylic polymer (P1) has a mass average molecular weight Mw of less than 100 000 g/mol, wherein the quantity of multi stage polymer in the composition comprising three components is between 3 wt % and 50 wt %.

Preferably the quantity of multi stage polymer in the composition is at least 4 wt %, more preferably at least 5 wt % and advantageously at least 6 wt % and most advantageously at least 7 wt %, based on the sum of the three compounds a), b) and c).

Preferably the quantity of multi stage polymer in the composition is at most 40 wt %, more preferably at most 30 wt % and advantageously at most 25 wt %, based on the sum of the three compounds a), b) and c).

Preferably the quantity of multi stage polymer in the composition is between is between 4 wt % and 40 wt % and more preferably between 5 wt % and 30 wt % and advantageously between 6 wt % and 25 wt % and advantageously between 7 wt % and 25 wt %, based on the sum of the three compounds a), b) and c).

Preferably the quantity of (meth) acrylic polymer (P1) in the composition is between 0.15 wt % and 47.5 wt % and preferably between 0.3 wt % and 45 wt %, based on the sum of the three compounds a), b) and c).

The composition of the present invention can also be in form of a prepreg or a preform.

In a first preferred embodiment the composition is in form of a preform.

With regard to the (meth)acrylic polymer (P1), it has a mass average molecular weight Mw of less than 100 000 g/mol, preferably less than 90 000 g/mol, more preferably less than 80 000 g/mol, still more preferably less than 70 000 g/mol, advantageously less than 60 000 g/mol, more advantageously less than 50 000 g/mol and still more advantageously less than 40 000 g/mol.

The (meth)acrylic polymer (P1), it has a mass average molecular weight Mw above 2 000 g/mol, preferably above 3000 g/mol, more preferably above 4000 g/mol, still more preferably above 5 000 g/mol, advantageously above 6 000 g/mol, more advantageously above 6 500 g/mol and even more advantageously above 7 000 g/mol, still more advantageously above 10 000 g/mol and most advantageously above 12 000 g/mol.

The mass average molecular weight Mw of (meth)acrylic polymer (P1) is between 2 000 g/mol and 100 000 g/mol, preferable between 3 000 g/mol and 90 000 g/mol and more preferably between 4 000 g/mol and 80 000 g/mol advantageously between 5000 g/mol and 70 000 g/mol, more advantageously between 6 000 g/mol and 50 000 g/mol and most advantageously between 10 000 g/mol and 40 000 g/mol.

Preferably the (meth)acrylic polymer (P1) is a copolymer comprising (meth)acrylic monomers. More preferably the (meth)acrylic polymer (P1) is a (meth) acrylic polymer. Still more preferably the (meth)acrylic polymer (P1) comprises at least 50 wt % monomers chosen from C1 to C12 alkyl (meth)acrylates. Advantageously preferably the (meth) acrylic polymer (P1) comprises at least 50 wt % of monomers chosen from C1 to C4 alkyl methacrylate and C1 to C8 alkyl acrylate monomers and mixtures thereof. Most advantageously the (meth)acrylic polymer (P1) comprises at least 50 wt % of polymerized methyl methacrylate.

Preferably the glass transition temperature Tg of the (meth)acrylic polymer (P1) is between 30° C. and 150° C. The glass transition temperature of the (meth)acrylic polymer (P1) is more preferably between 40° C. and 150° C., advantageously between 45° C. and 150° C. and more advantageously between 50° C. and 150° C.

Preferably the (meth)acrylic polymer (P1) is not cross-linked.

Preferably the (meth)acrylic polymer (P1) is not grafted on any other polymer or polymers.

Preferably the (meth)acrylic polymer (P1) has a melt flow index (MFI) according to ISO 1133 (230° C./3.8 kg) of at least 5 g/10 min, preferably at least 6 g/10 min, more preferably at least 7 g/10 min and most preferably at least 8 g/10 min.

More preferably the (meth)acrylic polymer (P1) has a melt flow index (MFI) according to ISO 1133 (230° C./3.8 kg) according to between 5 g/10 min and 100 g/10 min, preferably melt flow index is between 6 g/10 min and 90 g/10 min, more preferably between 7 g/10 min and 80 g/10 min, advantageously between 8 g/10 min and 70 g/10 min.

In a first preferred embodiment the (meth)acrylic polymer (P1) comprises from 50 wt % to 100 wt % methyl methacrylate, preferably from 80 wt % to 100 wt % methyl methacrylate, still more preferably from 80 wt % to 99.8 wt % methyl methacrylate and from 0.2 wt % to 20 wt % of an C1 to C8 alkyl acrylate monomer. Advantageously the C1 to C8 alkyl acrylate monomer is chosen from methyl acrylate, ethyl acrylate or butyl acrylate.

In a second preferred embodiment the (meth)acrylic polymer (P1) comprises between 0 wt % and 50 wt % of a functional monomer. Preferably the (meth)acrylic polymer (P1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (1) or (2):

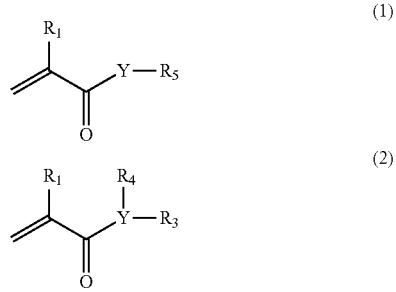

wherein in both formulas (1) and (2) $R_1$ is chosen from H or $CH_3$; and in formula (1) Y is O, $R_5$ is H or an aliphatic or aromatic radical having at least one atom that is not C or H; and in formula (2) Y is N and $R_4$ and/or $R_3$ is H or an aliphatic or aromatic radical.

Preferably the functional monomer (1) or (2) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol The multistage polymer according to the invention has at least two stages that are different in its polymer composition.

The multistage polymer is preferably in form of spherical polymer particles. These particles are also called core shell particles. The first stage forms the core, the second or all following stages the respective shells.

With regard to the spherical polymer particle, it has a weight average particle diameter between 20 nm and 800 nm. Preferably the weight average particle diameter of the polymer particle is between 25 nm and 600 nm, more preferably between 30 nm and 550 nm, still more preferably between 35 nm and 500 nm, advantageously between 40 nm and 400 nm, more advantageously between 50 nm and 400 nm, still more advantageously between 75 nm and 350 nm and most advantageously between 80 nm and 300 nm.

The primary polymer particles can be agglomerated giving a polymer powder comprising either the multi stage polymer or the (meth) acrylic polymer (P1) and the multi stage polymer.

The polymer particle is obtained by a multistage process such as a process comprising two, three or more stages.

The polymer particle has a multilayer structure comprising at least one layer (A) comprising a polymer (A1) having a glass transition temperature below 0° C. and another layer (B) comprising a polymer (B1) having a glass transition temperature over 30° C.

In a first preferred embodiment the polymer (B1) having a glass transition temperature of at least 30° C. is the external layer of the polymer particle having the multilayer structure.

In a second preferred embodiment the polymer (B1) having a glass transition temperature of at least 30° C. is an intermediate layer of the polymer particle having the multilayer structure.

Preferably the stage (A) is the first stage and the stage (B) comprising polymer (B1) is grafted on stage (A) comprising polymer (A1) or another intermediate layer. By first stage is meant that the stage (A) comprising polymer (A1) is made before the stage (B) comprising polymer (B1).

The polymer (A1) having a glass transition temperature below 0° C. in the layer (A) is never made during the last stage of the multistage process. This means that the polymer (A1) is never in the external layer of the particle with the multilayer structure. The polymer (A1) having a glass transition temperature below 0° C. in the layer (A) is either in the core of the polymer particle or one of the inner layers.

Preferably the polymer (A1) having a glass transition temperature below 0° C. in the layer (A) is made in the first stage of the multistage process forming the core for the polymer particle having the multilayer structure and/or before the polymer (B1) having a glass transition temperature over 60° C. Preferably the polymer (A1) is having a glass transition temperature below −5° C., more preferably below −15° C., advantageously below −25° C.

In a first preferred embodiment the polymer (B1) having a glass transition temperature over 60° C. is made in the last stage of the multistage process forming the external layer of the polymer particle having the multilayer structure.

In a second preferred embodiment the polymer (B1) having a glass transition temperature of at least 30° C. is an intermediate layer of the polymer particle having the multilayer structure, is made in a stage after the stage for forming the polymer (A1) of the multistage process.

There could be additional intermediate layer or layers obtained by an intermediate stage or intermediate stages.

Preferably at least a part of the polymer (B1) of layer (B) is grafted on the polymer made in the previous layer. If there are only two stages (A) and (B) comprising polymer (A1) and (B1) respectively, a part of polymer (B1) is grafted on polymer (A1). More preferably at least 50 wt % of polymer (B1) is grafted. The ratio of grafting can be determined by extraction with a solvent for the polymer (B1) and gravimetric measurement before and after extraction to determine the non-grafted quantity.

The glass transition temperature Tg of the respective polymers can be estimated for example by dynamic methods as thermo mechanical analysis.

In order to obtain a sample of the respective polymers (A1) and (B1) they can be prepared alone, and not by a multistage process, for estimating and measuring more easily the glass transition temperature Tg individually of the respective polymers of the respective stages.

With regard to the polymer (A1), in a first embodiment it is a (meth) acrylic polymer comprising at least 50 wt % of monomers from alkyl acrylates.

More preferably the polymer (A1) comprises a comonomer or comonomers which are copolymerizable with alkyl acrylate, as long as polymer (A1) is having a glass transition temperature of less than 0° C.

The comonomer or comonomers in polymer (A1) are preferably chosen from (meth)acrylic monomers and/or vinyl monomers.

The (meth)acrylic comonomer in polymer (A1) comprises monomers chosen from C1 to C12 alkyl (meth)acrylates. Still more preferably (meth)acrylic comonomer in polymer (A1) comprises monomers of C1 to C4 alkyl methacrylate and/or C1 to C8 alkyl acrylate monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 0° C.

Preferably the polymer (A1) is crosslinked. This means that a crosslinker is added to the other monomer or monomers. A crosslinker comprises at least two groups that can be polymerized.

In one specific embodiment polymer (A1) is a homopolymer of butyl acrylate.

In another specific embodiment polymer (A1) is a copolymer of butyl acrylate and at least one crosslinker. The crosslinker presents less than 5 wt % of this copolymer.

More preferably the glass transition temperature Tg of the polymer (A1) of the first embodiment is between −100° C. and 0° C., even more preferably between −100° C. and −5° C., advantageously between −90° C. and −15° C. and more advantageously between −90° C. and −25° C.

With regard to the polymer (A1), in a second embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

With regard to the polymer (A1), in a third embodiment the polymer (A1) having a glass transition temperature below 0° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In one embodiment the core is a butadiene homopolymer.

More preferably the glass transition temperature Tg of the polymer (A1) of the third embodiment comprising at least 50 wt % of polymeric units coming from isoprene or butadiene is between −100° C. and 0° C., even more preferably between −100° C. and −5° C., advantageously between −90° C. and −15° C. and even more advantageously between −90° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

The polymer (B1) can be crosslinked.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 30° C.

Advantageously the polymer (B1) comprises at least 50 wt %, more advantageously at least 60 wt % and even more advantageously at least 70 wt % of monomer units coming from methyl methacrylate.

Preferably the glass transition temperature Tg of the polymer (B1) is between 30° C. and 150° C. The glass transition temperature of the polymer (B1) is more preferably between 50° C. and 150° C., still more preferably between 70° C. and 150° C., advantageously between 90° C. and 150° C. and more advantageously between 90° C. and 130° C.

In another embodiment the multi stage polymer as described previously, has an additional stage, which is the (meth)acrylic polymer (P1). The primary polymer particle according to this embodiment of the invention has a multilayer structure comprising at least one stage (A) comprising a polymer (A1) having a glass transition temperature below 0° C., at least one stage (B) comprising a polymer (B1) having a glass transition temperature over 30° C. and at least one stage (P) comprising the (meth)acrylic polymer (P1) having a glass transition temperature between 30° C. and 150° C.

Preferably the (meth)acrylic polymer (P1) is not grafted on any of the polymers (A1) or (B1).

The (meth)acrylic polymer (P1) and the polymer (B1) are not the same polymer, even if their composition could be very close and some of their characteristics are overlapping. The essential difference is that the polymer (B1) is always part of the multistage polymer.

This is more explained in the process for preparing the composition according to the invention comprising the fibrous material, the (meth) acrylic polymer (P1) and the multi stage polymer.

With regard to the process for manufacturing the multistage polymer according to the invention it comprises the steps of
a) polymerizing by emulsion polymerization of a monomer or monomer mixture ($A_m$) to obtain at least one layer (A) comprising polymer (A1) having a glass transition temperature of less than 0° C.

b) polymerizing by emulsion polymerization of a monomer or monomer mixture ($B_m$) to obtain layer (B) comprising a polymer (B1) having a glass transition temperature of at least 30° C.

the monomer or monomer mixture ($A_m$) and the monomer or monomer mixture ($B_m$) are chosen from monomers according to the composition for polymer (A1) and polymer (B1) given earlier.

Preferably the step a) is made before step b). More preferably step b) is performed in presence of the polymer (A1) obtained in step a), if there are only two stages.

Still more preferably a graftlinking compound is used in order to graft at least a part of the polymer (B1) of step b) on the polymer (A1) of step a).

Advantageously the process for manufacturing the multistage polymer composition according to the invention is a multistep process comprises the steps one after the other of
- a) polymerizing by emulsion polymerization of a monomer or monomer mixture ($A_m$) to obtain one layer (A) comprising polymer (A1) having a glass transition temperature of less than 0° C.
- b) polymerizing by emulsion polymerization of a monomer or monomer mixture ($B_m$) to obtain layer (B) comprising a polymer (B1) having a glass transition temperature of at least 30° C.

The respective monomers or monomer mixtures ($A_m$) and (Bd for forming the layers (A) and (B) respectively comprising the polymers (A1) and (B1) respectively and the characteristics of the respective polymers (A1) and (B1) are the same as defined before.

Still more advantageously a graftlinking compound is used in order to graft at least a part of the polymer (B1) of step b) on the polymer (A1) of step a).

The process for manufacturing the multistage polymer can comprise additional steps for additional stages between the steps a) and b).

The process for manufacturing the multistage polymer can also comprise additional steps for additional stages before the steps a) and b). A seed could be used for polymerizing by emulsion polymerization the monomer or monomers mixture ($A_m$) to obtain the layer (A) comprising polymer (A1) having a glass transition temperature of less than 0° C. The seed is preferably a thermoplastic polymer having a glass transition temperature of at least 20° C.

The multistage polymer is obtained as an aqueous dispersion of the polymer particles. The solid content of the dispersion is between 10 wt % and 65 wt %.

With regard to the process for manufacturing the (meth) acrylic polymer (P1) according to the invention is comprises the step of polymerizing the respective (meth)acrylic monomers ($P1_m$). The respective (meth)acrylic monomers ($P1_m$) are the same as defined before for the (meth)acrylic polymer (P1) and two preferred embodiments the (meth)acrylic polymer (P1).

The (meth)acrylic homo or copolymer (P1) could be made in batch or semi-continuous process:
- for the batch process, the mixture of monomers is introduced in one shot just before or after introduction of one or part of the initiator system
- for the semi-continuous process, the monomer mixture is added in multiple shots or continuously in parallel to the initiator addition (the initiator is also added in multiple shots or continuously) during a defined period of addition which could be in the range 30 to 500 min.

The process for preparing the composition according to the invention comprising the fibrous material, the (meth) acrylic polymer (P1) and the multi stage polymer has two preferred embodiments.

In both cases the fibrous material is brought into contact with the (meth) acrylic polymer (P1) and the multi stage polymer. The (meth) acrylic polymer (P1) and the multi stage polymer can be apart or added together in a polymeric composition (PC1). The polymeric composition (PC1) can be obtained by two preferred processes.

In a first preferred embodiment of the process, the (meth) acrylic polymer (P1) is polymerized in the presence of the multistage polymer. The (meth) acrylic polymer (P1) is made as an additional stage of the multistage polymer for giving polymeric composition (PC1). The (meth) acrylic polymer (P1) is a layer on the multistage polymer and as it is an additional layer it is the outer layer on top of the multistage polymer. The (meth) acrylic polymer (P1) is not grafted on the multistage polymer.

In a second preferred embodiment of the process, the (meth) acrylic polymer (P1) is polymerized apart and mixed or blended with the multistage polymer for giving polymeric composition (PC1).

With regard to the process according to the first preferred embodiment for preparing the polymeric composition (PC1) comprising the (meth) acrylic polymer (P1) and the multi stage polymer, it comprises the steps of
- a) polymerizing by emulsion polymerization of a monomer or monomer mixture ($A_m$) to obtain one layer in stage (A) comprising polymer (A1) having a glass transition temperature of less than 0° C.
- b) polymerizing by emulsion polymerization of a monomer or monomer mixture ($B_m$) to obtain layer in stage (B) comprising a polymer (B1) having a glass transition temperature of at least 30° C.
- c) polymerizing by emulsion polymerization of a monomer or monomer mixture ($P1_m$) to obtain a layer in this additional stage comprising the (meth) acrylic polymer (P1) having a glass transition temperature of at least 30° C.

characterized that the (meth) acrylic polymer (P1) has a mass average molecular weight Mw of less than 100 000 g/mol.

Preferably the step a) is made before step b).

More preferably step b) is performed in presence of the polymer (A1) obtained in step a). Still more preferably a graftlinking compound is used in order to graft at least a part of the polymer (B1) of step b) on the polymer (A1) of step a).

Advantageously the method for manufacturing the polymer composition (PC1) comprising the (meth) acrylic polymer (P1) and the multi stage polymer is a multistep process and comprises the steps one after the other of
- a) polymerizing by emulsion polymerization of a monomer or monomer mixture ($A_m$) to obtain one layer in stage (A) comprising polymer (A1) having a glass transition temperature of less than 0° C.
- b) polymerizing by emulsion polymerization of a monomer or monomer mixture ($B_m$) to obtain layer in stage (B) comprising a polymer (B1) having a glass transition temperature of at least 30° C.
- c) polymerizing by emulsion polymerization of a monomer or monomer mixture ($P1_m$) to obtain a layer in this additional stage comprising the (meth) acrylic polymer (P1) having a glass transition temperature of at least 30° C.

characterized that the (meth) acrylic polymer (P1) has a mass average molecular weight Mw of less than 100 000 g/mol.

Still more advantageously a graftlinking compound is used in order to graft at least a part of the polymer (B1) of step b) on the polymer (A1) of step a).

The respective monomers or monomer mixtures $(A_m)$, $(B_m)$ and $(P1_m)$ for forming the layers (A), (B) and additional stage respectively comprising the polymers (A1), (B1) and (P1) respectively, are the same as defined before. The characteristics of the polymers (A1), (B1) and (P1) respectively, are the same as defined before.

The polymer composition (PC1) is obtained as an aqueous dispersion of the polymer particles. The solid content of the dispersion is between 10 wt % and 65 wt %.

Optionally the method for manufacturing the polymer composition comprising the (meth) acrylic polymer (P1) and the multi stage polymer comprises the additional step d) of recovering of this polymer composition.

By recovering is meant partial or separation between the aqueous and solid phase, latter comprises the polymer composition.

More preferably according to the invention the recovering of the polymer composition is made by coagulation or by spray-drying.

Spray drying is the preferred method for the recovering and/or drying for the manufacturing method for a polymer powder composition according to the present invention if the polymer (A1) having a glass transition temperature below 0° C. comprises at least 50 wt % of polymeric units coming from alkyl acrylate and the stage (A) is the most inner layer of the polymer particle having the multilayer structure.

Coagulation is the preferred method for the recovering and/or drying for the manufacturing method for a polymer powder composition according to the present invention if the polymer (A1) having a glass transition temperature below 0° C. comprises at least 50 wt % of polymeric units coming from isoprene or butadiene and the stage (A) is the most inner layer of the polymer particle having the multilayer structure.

The method for manufacturing the polymer composition according to the invention can comprise optionally the additional step e) of drying of the polymer composition.

Preferably the drying step e) is made if the step d) of recovering of the polymer composition is made by coagulation.

Preferably after the drying step an e) the polymer composition comprises less than 3 wt %, more preferably less than 1.5 wt % advantageously less than 1% of humidity or water.

The humidity of a polymer composition can be measure with a thermo balance.

The drying of the polymer can be made in an oven or vacuum oven with heating of the composition for 48 hours at 50° C.

With regard to the process according to the second preferred embodiment for preparing the polymeric composition (PC1) comprising the (meth) acrylic polymer (P1) and the multi stage polymer, it comprises the steps of
  a) mixing of the (meth) acrylic polymer (P1) and the multi stage polymer
  b) optionally recovering the obtained mixture of previous step in form of a polymer powder
wherein the (meth) acrylic polymer (P1) and the multi stage polymer in step a) are in form of a dispersion in aqueous phase.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at least 5 wt %, preferably at least 10 wt %, more preferably at least 20 wt % and advantageously at least 50 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is at most 99 wt %, preferably at most 95 wt % and more preferably at most 90 wt %.

The quantities of the aqueous dispersion of the (meth) acrylic polymer (P1) and the aqueous dispersion of the multi stage polymer are chosen in a way that the weight ratio of the multi stage polymer based on solid part only in the obtained mixture is between 5 wt % and 99 wt %, preferably between 10 wt % and 95 wt % and more preferably between 20 wt % and 90 wt %.

The polymer composition (PC1) is obtained as an aqueous dispersion of the polymer particles, if recovering step b) takes not place. The solid content of the dispersion is between 10 wt % and 65 wt %.

In one embodiment the recovering step b) of the process for manufacturing the polymer composition comprising the (meth) acrylic polymer (P1) and the multi stage polymer, is not optional and is preferably made by coagulation or by spray drying.

The process for manufacturing the polymer composition comprising the (meth) acrylic polymer (P1) and the multi stage polymer can optionally comprise the additional step c) for drying the polymer composition.

By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The process for manufacturing the polymer composition comprising the (meth) acrylic polymer (P1) and the multi stage polymer yields preferably to a polymer powder. The polymer powder of the invention is in form of particles. A polymer powder particle comprises agglomerated primary polymer particles made by multistage process and the (meth) acrylic polymer (P1).

With regard to the polymer powder comprising the (meth) acrylic polymer (P1) and the multi stage polymer according to the two embodiments of the process of preparation, it has a volume median particle size D50 between 1 μm and 500 μm. Preferably the volume median particle size of the polymer powder is between 10 μm and 400 μm, more preferably between 15 μm and 350 μm and advantageously between 20 μm and 300 μm.

The D10 of the particle size distribution in volume is at least 7 μm and preferably 10 μm.

The D90 of the particle size distribution in volume is at most 950 μm and preferably 500 μm, more preferably at most 400 μm.

The weight ratio r of the (meth) acrylic polymer (P1) in relation to the multi stage polymer is at least 5 wt %, more preferably at least 7 wt % and still more preferably at least 10 wt %.

According to the invention the ratio r of the (meth) acrylic polymer (P1) in relation to the multi stage polymer is at most 95 w %.

Preferably the weight ratio of the (meth) acrylic polymer (P1) in relation to the multi stage polymer is between 5 wt % and 95 wt % and preferably between 10 wt % and 90 wt %.

With regard to the fibrous material, one can mention fabrics, felts or nonwovens that may be in the form of strips, laps, braids, locks or pieces. The fibrous material can have different forms and dimensions either one dimensional, two dimensional or three dimensional. A fibrous material comprises an assembly of one or more fibres. When the fibres are continuous, their assembly forms fabrics.

The one dimensional form is linear long fibres. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two dimensional form are fibrous mats or non-woven reinforcements or woven roving or bundles of fibers, which can also be braided.

The three dimensional form are for example stacked or folded fibrous mats or non-woven reinforcements or bundles of fibers or mixtures thereof, an assembly of the two dimensional form in the third dimension.

The origins of the fibrous material can be a natural or a synthetic one. As natural material one can mention vegetable fibers, wood fibers, animal fibers or mineral fibers.

Natural fibers are for example sisal, jute, hemp, flax, cotton, coconut fibers, and banana fibers. Animal fibers are for example wool or hair.

As synthetic material one can mention polymeric fibers chosen from fibers of thermosetting polymers, from thermoplastic polymers or their mixtures.

The polymeric fibers can be made of polyamide (aliphatic or aromatic), polyester, polyvinylacohol, polyolefins, polyurethanes, polyvinylchloride, polyethylene, unsaturated polysters, epoxy resins and vinylesters.

The mineral fibers can also be chosen from glass fibers especially of type E, R or S2, carbon fibers, boron fibers or silica fibers.

The fibrous material of the present invention is chosen from vegetable fibers, wood fibers, animal fibers, mineral fibers, synthetic polymeric fibers, glass fibers, carbon fibers or mixtures thereof.

Preferably the fibrous material is two or three dimensional.

With regard to the process for manufacturing the composition according to the invention, it comprises the steps of
a) bringing into contact a fibrous material and the a multistage polymer and a (meth) acrylic polymer (P1), wherein the quantity of the multistage polymer is between 3 wt % and 50 wt % of the composition and the (meth) acrylic polymer (P1) has a mass average molecular weight Mw of less than 100 000 g/mol.

The step a) of said process can be made by dipping, infusion or impregnation of the fibrous material with an aqueous dispersion comprising the multistage polymer and (meth) acrylic polymer (P1) or by powdering the fibrous material with a powder comprising the multistage polymer and (meth) acrylic polymer (P1). Preferably the multistage polymer and the (meth) acrylic polymer (P1) are in from of the polymeric composition (PC1) as described before.

If the polymeric composition (PC1) is in form of an aqueous dispersion process comprises the additional step b) drying the product of step a). Additionally a step c) heating the dried product of b) can be added.

The step b) is made by evaporation of the aqueous phase or by slightly heating. Preferably step b) is made by heating to at least 45° C.

If the polymeric composition (PC1) is in form of a dry powder the process comprises the additional step c) heating the composition.

The step c) is made in a mold at a temperature between 100° C. and 250° C. Preferably between 125° C. and 225° C. The mold can be under pressure.

The process for manufacturing the composition especially in form of a preform can also comprise the step of transforming the preform. This can either be made during step c), that the heating take place in a mold with a certain form, or that the preform is transformed to another form under heating again after step c).

The composition or preform of the invention can be used to manufacture polymeric composite material or mechanical or structured parts or articles comprising the polymeric composite material.

The composition or preform of the invention is used in a process like infusion, vacuum bag moulding, pressure bag molding, autoclave molding, resin transfer moulding (RTM), reaction injection molding (RIM) reinforced reaction injection molding (R-RIM) and variants thereof, press molding or compression molding.

Preferably the process is resin transfer moulding.

During this process a matrix or continuous phase is added to the composition or preform and an impact modified polymeric composite material or mechanical or structured parts or articles comprising the polymeric composite material is obtained.

The matrix or continuous phase of the polymeric composite material is a thermoset polymer or a thermoplastic polymer.

As an example the process for manufacturing the impact modified polymeric composite material is made by a moulding process. The processes generally involve the steps of shaping the preform to match the contours of a mold, placing the shaped preform into a mold, injecting an uncured or melted molding resin or to be polymerized syrup into the mold, and then curing or cooling the molding resin or polymerizing as needed to form a solid molded polymer composite.

[Methods of Evaluation]

Particle Size Analysis

The particle size of the primary particles after the multistage polymerization is measured with a Zetasizer Nano S90 from MALVERN. The particle size of the polymer powder is measured with Malvern Mastersizer 3000 from MALVERN. For the estimation of volume median particle size D50 a Malvern Mastersizer 3000 apparatus with a 300 mm lenses, measuring a range from 0.5-880 µm is used.

Glass Transition Temperature

The glass transitions (Tg) of the multistage polymers is measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

EXAMPLES

Following materials are used or prepared:

A fibrous substrate in form of a glass fibre fabric is used: glass fabrics (glass E plain weave HexForce® 01717 820 TF970 form the company Hexcel with a nominal weight of 160 g/m2) with a dimension of 30 cm×20 cm.

As multistage polymer a polymeric impact modifier is prepared according to the technique described in U.S. Pat. No. 4,278,576, which employs a standard emulsion polymerization technique.

As polymeric impact modifier (IM1) a core/shell acrylic polymer impact modifier is prepared by a multistage process employing 89.2 parts of butyl acrylate, 0.4 parts of butylene glycol diacrylate and 0.4 parts of diallymaleate as elastomeric core, followed by a polymerization of 10 parts of methyl methacrylate. The solid content is 40% of the aqueous dispersion of (IM1).

Synthesis of the copolymer P1: semi continuous process: charged into a reactor, with stirring, were 1700 g of de-ionized water, 0.01 g of FeSO4 and 0.032 g of ethylenediaminetetraacetic acid, sodium salt (dissolved in 10 g of de-ionized water), 3.15 g of sodium formaldehydesulfoxylate dissolved if 110 g of de-ionized water and 21.33 g of emulsifier potassium salt of beef tallow fatty acid (dissolved in 139.44 g of water), and the mixture was stirred until complete dissolution. Three vacuum-nitrogen purges were carried out in succession and the reactor left under a slight vacuum. The reactor was then heated. At the same time, a mixture comprising 1066.7 960.03 g of methyl methacrylate and 10.67 g of n-octyl mercaptan was nitrogen-degassed for 30 minutes. The reactor is heated at 63° C. and maintained at that temperature. Next, the mixture was introduced into the reactor during 180 min using a pump. In parallel, a solution of 5.33 g of ter-butyl hydroperoxide (dissolved in 100 g of de-ionized water) is introduced (same addition time). The lines was rinsed with 50 g and 20 g of water. Then the reaction mixture was heated at a temperature of 80° C. and the polymerization was then left to completion for 60 minutes after the end of the monomers addition. The reactor was cooled down to 30° C. The obtained solid content is 34.20. The mass average molecular weight of the copolymer P1 is $M_w$=28 000 g/mol.

A composition comprising a multistage polymer and a meth acrylic polymer (P1) is prepared by mixing 1000 g of the aqueous dispersion of (IM1) with 200 g of the aqueous dispersion of (P1).

The glass fibre fabric is dipped several times in the mixture of the aqueous dispersion of (IM1) and of (P1) in order to soak the fabric. The number of dipping steps is varied in order to have different quantities of mixtures of multistage polymer (IM1) and (P1) from the dispersion on the fabric.

The fabric is dried in an oven at 50° C.

The quantity of the mixture of multistage polymer and polymer (P1) in the fabric is calculated by weighting the fabric before the dipping and after drying.

Following products are obtained:

Example 1

The mixture of multistage polymer (IM1) and meth acrylic polymer (P1) is at 6 wt % in the fabric.

Example 2

The mixture of multistage polymer (IM1) and meth acrylic polymer (P1) is at 8.5 wt % in the fabric

Example 3

The mixture of multistage polymer (IM1) and meth acrylic polymer (P1) is at 15 wt % in the fabric.

Comparative Example 1

The mixture of multistage polymer (IM1) and meth acrylic polymer (P1) is at 3 wt % in the fabric.

Comparative Example 2

The process of the previous examples is repeated of dipping the fabric, but instead of the mixture only the aqueous dispersion of (IM1) is used. The multistage polymer (IM1) is at 3 wt % in the fabric.

Three layers of each fabric or ply are stacked in order to obtain a thickness of about 1 mm. The stack is put into a mould under pressure and the temperature is increased during 10 min from 20° C. up to 200°. The 200° C. are held for 15 min, then the mould is cooled down to 70° C. during 25 min and the preform is removed from the mold.

The cohesion between the ply's is sufficient for making a preform. The preforms made with examples 1, 2 and 3, keep their form for several weeks and can be used as preforms.

The preforms made with comparative examples 1 and 2 are less stable and the form obtained in the mold changes, more important for comparative example 2 than for comparative example 1.

The invention claimed is:

1. A composition comprising
a) a fibrous material,
b) a multi stage polymer, and
c) a (meth) acrylic polymer (P1),
wherein the quantity of multi stage polymer is between 3 wt % and 50 wt % of the composition and the (meth) acrylic polymer (P1) has a mass average molecular weight Mw of less than 100,000 g/mol.

2. The composition according to claim 1 wherein the (meth) acrylic polymer (P1) has a mass average molecular weight Mw between 5,000 g/mol and 70,000 g/mol.

3. The composition according to claim 1 wherein the quantity of (meth) acrylic polymer (P1) is between 0.15 wt % and 47.5 wt %.

4. The composition according to claim 1 wherein the composition is in a form of a preform.

5. The composition according to claim 1 wherein the multistage polymer is in a form of spherical polymer particles having a weight average particle size between 20 nm and 800 nm.

6. The composition according to claim 1 wherein the quantity of multi stage polymer is at least 6 wt %.

7. The composition according to claim 1 wherein the quantity of multi stage polymer is at least 7 wt %, based on the sum of the three compounds a), b) and c).

8. The composition according to claim 1 wherein the quantity of multi stage polymer is between 5 wt % and 30 wt % of the composition.

9. The composition according to claim 1 wherein the quantity of multi stage polymer is between 7 wt % and 25 wt % of the composition, based on the sum of the three compounds a), b) and c).

10. The composition according to claim 1 wherein the multi stage polymer comprises,
   a) one stage (A) comprising a polymer (A1) having a glass transition temperature of less than 0° C., and
   b) one stage (B) comprising a polymer (B1) having a glass transition temperature of at least 30° C.

11. The composition according to claim 10 wherein polymers (A1) and (B1) are acrylic or methacrylic polymers.

12. The composition according to claim 10 wherein polymer (A1) is a silicone rubber based polymer.

13. The composition according to claim 10 wherein polymers (A1) comprises at least 50 wt % of polymeric units coming from isoprene or butadiene.

14. The composition according to claim 10 wherein the stage (A) is a first stage and stage (B) comprising polymer (B1) is grafted on stage (A) comprising polymer (A1).

15. The composition according to claim 1 wherein (meth) acrylic polymer (P1) is not grafted on any other polymer or polymers.

16. The composition according to claim 1 wherein (meth) acrylic polymer (P1) comprises at least 50 wt % monomers chosen from the group consisting of C1 to C12 alkyl (meth)acrylates.

17. The composition according to claim 1 wherein (meth) acrylic polymer (P1) comprises from 50 wt % to 100 wt % methyl methacrylate.

18. The composition according to claim 1 wherein (meth) acrylic polymer (P1) comprises between 0 wt % and 50 wt % of a functional monomer.

19. A process for manufacturing the composition according to claim 1, said process comprising a step of:
   a) bringing into contact said fibrous material, with the multistage polymer and said (meth) acrylic polymer (P1).

20. The process according to claim 19, wherein step a) comprises dipping, infusing or impregnating the fibrous material with an aqueous dispersion comprising the multistage polymer and (meth) acrylic polymer (P1).

21. The process according to claim 19, wherein the process comprises an additional step b): drying the product of step a).

22. The process according to claim 20, wherein step a) comprises powdering the fibrous material with a powder comprising the multistage polymer and (meth) acrylic polymer (P1).

23. The process according to claim 20, wherein the process comprises an additional step c): heating the composition.

* * * * *